(12) United States Patent
Wells et al.

(10) Patent No.: US 7,471,337 B2
(45) Date of Patent: Dec. 30, 2008

(54) METHOD OF AUDIO-VIDEO SYNCHRONIZATION

(75) Inventors: Paul J. Wells, Fremont, CA (US); Herve Brelay, San Jose, CA (US)

(73) Assignee: LSI Corporation, Milpitas, CA (US)

(*) Notice: Subject to any disclaimer, the term of this patent is extended or adjusted under 35 U.S.C. 154(b) by 983 days.

(21) Appl. No.: 10/863,908

(22) Filed: Jun. 9, 2004

(65) Prior Publication Data

US 2005/0276282 A1 Dec. 15, 2005

(51) Int. Cl.
*H04N 9/475* (2006.01)

(52) U.S. Cl. .................. 348/515; 348/512; 348/516

(58) Field of Classification Search .............. 348/512, 348/515, 516; 370/509
See application file for complete search history.

(56) References Cited

U.S. PATENT DOCUMENTS

| | | | | |
|---|---|---|---|---|
| 4,809,093 A * | 2/1989 | Hamabe et al. | ............... | 360/67 |
| 5,467,139 A * | 11/1995 | Lankford | ............... | 348/512 |
| 5,920,572 A * | 7/1999 | Washington et al. | ............... | 370/535 |
| 5,959,684 A * | 9/1999 | Tan et al. | ............... | 348/515 |
| 6,034,731 A * | 3/2000 | Hurst, Jr. | ............... | 375/240.26 |
| 6,061,399 A * | 5/2000 | Lyons et al. | ............... | 375/240 |
| 6,181,383 B1 * | 1/2001 | Fox et al. | ............... | 348/515 |
| 6,262,777 B1 * | 7/2001 | Brewer et al. | ............... | 348/515 |
| 6,690,428 B1 * | 2/2004 | Hudelson et al. | ............... | 348/461 |
| 6,744,815 B1 * | 6/2004 | Sackstein et al. | ............... | 375/240 |
| 6,803,964 B1 * | 10/2004 | Post et al. | ............... | 348/423.1 |
| 6,823,310 B2 * | 11/2004 | Ishito et al. | ............... | 704/270 |
| 6,842,485 B2 * | 1/2005 | Monda et al. | ............... | 375/240.25 |
| 6,850,284 B2 * | 2/2005 | Gries et al. | ............... | 348/512 |
| 6,956,871 B2 * | 10/2005 | Wang et al. | ............... | 370/503 |
| 6,975,363 B1 * | 12/2005 | Baldwin et al. | ............... | 348/512 |
| 6,993,251 B1 * | 1/2006 | Phillips et al. | ............... | 386/125 |
| 7,012,650 B2 * | 3/2006 | Hu et al. | ............... | 348/515 |
| 7,230,652 B2 * | 6/2007 | Demas et al. | ............... | 348/512 |
| 2002/0047937 A1 * | 4/2002 | Wells | ............... | 348/705 |
| 2002/0128822 A1 * | 9/2002 | Kahn | ............... | 704/200.1 |
| 2002/0150126 A1 * | 10/2002 | Kovacevic | ............... | 370/503 |
| 2003/0021298 A1 * | 1/2003 | Murakami et al. | ............... | 370/535 |
| 2003/0123556 A1 * | 7/2003 | Komori | ............... | 375/240.26 |
| 2003/0179319 A1 * | 9/2003 | Demas et al. | ............... | 348/565 |

(Continued)

OTHER PUBLICATIONS

Advanced Television Systems Committee, ATSC Implementation Subcommittee Finding: Relative Timing of Sound and Vision for Broadcast Operations, Doc. IS-191, Jun. 26, 2003, pp. 1-4.

(Continued)

*Primary Examiner*—Brian P Yenke
(74) *Attorney, Agent, or Firm*—Christopher P. Maiorana, PC

(57) ABSTRACT

A method for synchronization of an audio stream and a video stream comprising the steps of (A) determining a first presentation time stamp from the video stream and generating a first handshake signal when the video stream is ready to be transmitted, (B) repeating and dropping one or more audio frames of the audio stream in response to the first handshake signal and a plurality of first predetermined threshold values until a second presentation time stamp from the audio stream matches the first presentation time stamp and generating a second handshake signal when the audio stream is ready to be transmitted and (C) transmitting the video stream and the audio stream in response to the second handshake signal.

24 Claims, 8 Drawing Sheets

U.S. PATENT DOCUMENTS

| | | |
|---|---|---|
| 2004/0001695 A1* | 1/2004 | Evans et al. .................... 386/68 |
| 2004/0075767 A1* | 4/2004 | Neuman et al. ............. 348/506 |
| 2006/0015348 A1* | 1/2006 | Cooper et al. ................ 704/500 |
| 2006/0031898 A1* | 2/2006 | Baldwin et al. ............. 725/100 |
| 2006/0093315 A1* | 5/2006 | Kelly et al. ................... 386/52 |
| 2006/0140575 A1* | 6/2006 | Fuchigami et al. ............. 386/1 |
| 2006/0168524 A1* | 7/2006 | Saeki ........................ 715/728 |
| 2007/0286572 A1* | 12/2007 | Komori ....................... 386/84 |

OTHER PUBLICATIONS

Advanced Television Systems Committee, ATSC Implementation Subcommittee Finding: PTS Time Stamping AC-3 Bit Streams, Doc. IS/161, Jan. 6, 2000, updated Feb. 28, 2003, pp. 1-6.

* cited by examiner

METHOD OF AUDIO-VIDEO SYNCHRONIZATION

FIELD OF THE INVENTION

The present invention relates to audio and video generally and, more particularly, to a method for audio-video synchronization.

BACKGROUND OF THE INVENTION

Audio-visual (A/V) synchronization errors as short as plus or minus one-half film frame can be detected by most film editors. Since film is projected at 24 frames per second (fps) in the U.S. and 25 fps in Europe, one-half film frame equates to approximately +/−20 msec. Similarly, plus or minus one video frame corresponds to +/−33-40 msec.

The acceptable range in which audio-video synchronization can vary is non-symmetrical because human perception of audio-video synchronization is weighted more in one direction than the other. Because light travels much faster than sound, events are usually seen before the accompanying sound is heard. For example, simultaneously seeing and hearing a basketball hitting the court in a large sports venue appears relatively correct to the first few rows. However, the further back a viewer is located, the more the sound of the ball hitting the floor lags behind the sight of the ball hitting the floor. Even though the amount the sound lags increases the further back the viewer is located, the difference is perceived as natural.

However, if the audio-video timing was reversed, a spectator watching a basketball game would hear the sound of the ball hitting the floor before the ball appeared to make contact with the floor. The arrival of the sound of the ball hitting the floor before the ball appears to have hit the floor would be a very unnatural experience. The discrepancy would seem incorrect even to spectators in the first few rows where the amount of audio-visual synchronization error would be small because the error is in the "wrong" direction. In particular, human perception is much more forgiving for sound lagging behind sight.

International Telecommunications Union (ITU) recommendation ITU-R BT.1359-1 (1998) was based on research that showed the reliable detection of audio-video synchronization errors fell between 45 msec for audio leading video and 125 msec for audio lagging behind video. The recommendation states that the tolerance from the point of capture to the viewer and or listener should be no more than 90 msec for audio leading video to 185 msec for audio lagging behind video. The Advanced Television Systems Committee (ATSC) Implementation Subcommittee (IS) issued a finding (Doc. IS-191 (Jun. 23, 2003)) recommending a tolerance of +/−15 msec.

Conventional solutions synchronize audio and video by setting the audio as master and dropping or repeating frames of video to synchronize the two signals. However, dropping and repeating video frames can affect the quality of the video image presented.

A method of synchronizing audio and video without affecting the quality of the video presented would be desirable. It would also be desirable to switch seamlessly between trick play modes (e.g., x1.5 playback) and normal (e.g., x1) modes without stopping the playback and/or going through a full handshake procedure to avoid a gap in either or both the audio and the video.

SUMMARY OF THE INVENTION

The present invention concerns a method for synchronization of an audio stream and a video stream comprising the steps of (A) determining a first presentation time stamp from the video stream and generating a first handshake signal when the video stream is ready to be transmitted, (B) repeating and dropping one or more audio frames of the audio stream in response to the first handshake signal and a plurality of first predetermined threshold values until a second presentation time stamp from the audio stream matches the first presentation time stamp and generating a second handshake signal when the audio stream is ready to be transmitted and (C) transmitting the video stream and the audio stream in response to the second handshake signal.

The objects, features and advantages of the present invention include providing a method and/or apparatus for audio-video synchronization that may (i) switch between modes without stopping playback (ii) use video as a master during synchronization, (iii) synchronize multiple audio streams to a video stream, (iv) synchronize an analog audio stream to a digital audio stream, (v) provide hysteresis in the synchronization of audio and video, (vi) maintain alignment of audio and video by use of a multi-level synchronization correction feedback loop with hysteresis on switching between levels and/or (vii) provide hysteresis on switching between unmute and mute states.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally provides an audio and video decoder that may use video as master and audio as slave. The use of video as master generally maintains the quality of the video. In some cases, however, using video as master may not be easy because of difficulty in maintaining accurate points on both audio and video streams. For example, accurate points may be difficult to maintain in a DVD video playback system operating at 1.5 times normal speed. For example, with audio as slave, if the sync offset is large enough to require frame add/drop, the drops may be audible. The present invention may be configured to provide modes that may operate as x1 playback where the video is the master and modes, such as x1.5, where the video is the slave.

The present invention may use an audio master operating at x1.5 for a rough synchronization and go straight into the x1 audio slave fine synchronization state without muting the audio. The present invention may use a process directly analogous to the process for fine synchronization after a rough synchronization in a handshake mode (described below in connection with FIG. 5).

Figure 1:
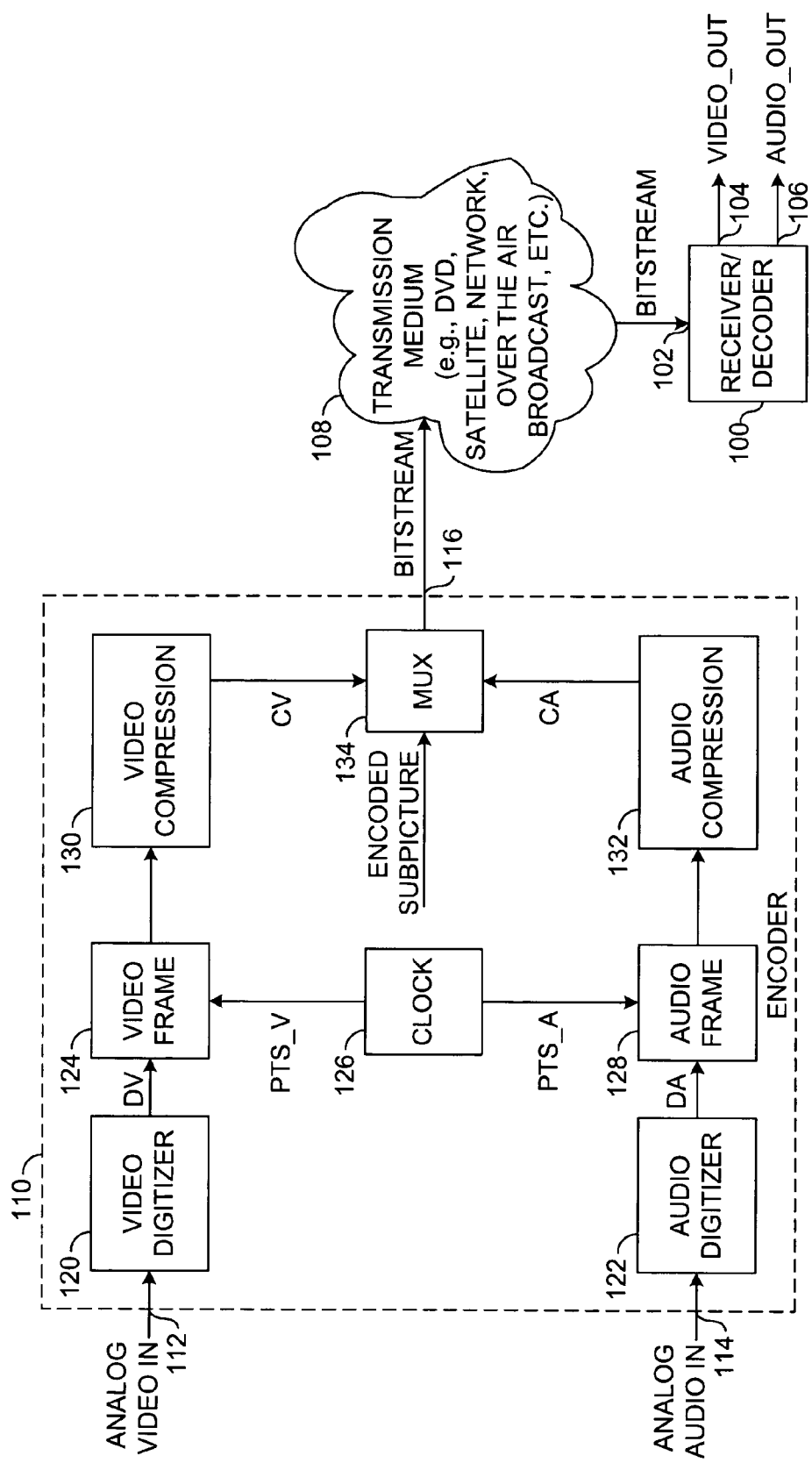
FIG. 1 is a block diagram illustrating an audio-video system in accordance with a preferred embodiment of the present invention.

Referring to FIG. 1, a block diagram of a circuit 100 in accordance with a preferred embodiment of the present invention is shown in the context of an audio-video transmission system. The circuit 100 may be implemented as a receiver/decoder. The circuit 100 may be configured to maintain audio-video synchronization by changing a rate of data consumption. In one example, the rate of data consumption may be changed even though the audio is unmuted. The circuit 100 may be further configured to fine tune the audio-video synchronization by repeating and/or dropping audio frames and/or audio samples. The circuit 100 may be further configured to implement hysteresis in the decisions to repeat and/or drop audio frames and/or samples. The hysteresis may be implemented with a plurality of thresholds that control when audio frames and/or samples are repeated and/or dropped.

The circuit 100 may have an input 102 that may receive an encoded bitstream (e.g., BITSTREAM), an output 104 that may present a signal (e.g., VIDEO_OUT) and an output 106 that may present a signal (e.g., AUDIO_OUT). The signal BITSTREAM may be received from any of a number of transmission media or sources 108 (e.g., DVD player, satellite box, set-top-box, network, over-the-air broadcast, etc.). The signal BITSTREAM may be encoded in accordance with any appropriate encoding and/or compression standard (e.g., MPEG-2, MPEG-4, H.264, etc.).

The signal VIDEO_OUT may comprise one or more video signals. For example, the signal VIDEO_OUT may comprise in one embodiment an analog video signal. In another example, the signal VIDEO_OUT may comprise an analog video signal and a digital video signal. Alternatively, the signal VIDEO_OUT may comprise a main picture signal and a sub-picture signal. However, other video signals may be implemented as part of the signal VIDEO_OUT to meet the design criteria of a particular application.

The signal AUDIO_OUT may comprise one or more audio signals. In one example, the signal AUDIO_OUT may be implemented as an analog audio signal. In another example, the signal AUDIO_OUT may be implemented as a multichannel audio signal. For example, the signal AUDIO_OUT may be implemented as a 5.1 channel audio output. The signal AUDIO_OUT may comprise, for example, both analog audio and digital audio signals (e.g., an IEC60958 signal, IEC61937 data streams, etc.). The IEC61937 data streams may comprise multichannel sound (e.g., MPEG-2, AC-3, DTS, etc.). When the signal AUDIO_OUT includes an IEC61937 digital audio signal, the bits carrying audio samples may be replaced with data bits from the datastream and headers of, for example, a Sony/Philips digital interface format (S/PDIF) signal.

In one example, the signal BITSTREAM may be generated by an encoder circuit 110. The encoder circuit 110 may have an input 112 that may receive a signal (e.g., VIDEO_IN), an input 114 may receive a signal (e.g., AUDIO_IN), and an output 116 that may present the signal BITSTREAM. The signal VIDEO_IN may comprise one or more analog video signals. The signal AUDIO_IN may comprise one or more analog audio signals. Alternatively, the signals VIDEO_IN and AUDIO_IN may comprise digital signals.

In one example, the encoder 110 may comprise a block 120, a block 122, a block 124, a block 126, a block 128, a block 130, a block 132, and a block 134. The block 120 may be implemented as a video digitizer. The block 122 may be implemented as an audio digitizer. The block 124 may be implemented as a video frame buffer. The block 128 may be implemented as an audio frame buffer. The block 126 may be implemented as a presentation (or system) clock source. The block 126 may be configured, for example, to generate Society of Motion Picture and Television Engineers (SMPTE) time codes. The block 130 may be implemented as a video compression block. The block 132 may be implemented as an audio compression block. The block 134 may be implemented as a multiplexing block.

The block 120 may be configured to generate a digital (e.g., sampled) video signal (e.g., DV) in response to the signal VIDEO_IN. The block 122 may be configured to generate a digitized (e.g., sampled) audio signal (e.g., DA) in response to the signal AUDIO_IN. However, when one or more of the signals VIDEO_IN and AUDIO_IN are implemented as digital signals, one or both of the circuits 120 and 122 may be omitted.

The digitized video signal DV may be presented to an input of the block 124. The block 124 may have a second input that may receive a presentation time-stamp (e.g., PTS_V) from the circuit 126. The digitized audio signal DA may be presented to an input of the audio frame block 128. The audio frame block 128 may have a second input that may receive a presentation time-stamp (e.g., PTS_A) from the circuit 126. In general, the circuits 124 and 128 may be configured to associate a presentation time-stamp with each video frame and each audio frame, respectively. For example, each video frame and each audio frame may be configured to have a header portion containing an associated presentation time-stamp.

The circuit 124 may present one or more video frames and the associated presentation time-stamps (e.g., PTS_V) to an input of the video compression block 130. The video compression block 130 may present a compressed video signal (e.g., CV) to a first input of the circuit 134. The circuit 128 may present one or more audio frames and the associated presentation time-stamps (e.g., PTS_A) to an input of the audio compression block 132. The audio compression block 132 may present a compressed audio signal (e.g., CA) to a second input of the circuit 134. The audio and video signals may be compressed using any appropriate compression scheme (e.g., MPEG-2, MPEG-4, H.264, etc.).

The circuit 134 is generally configured to generate the signal BITSTREAM in response to the compressed video signal CV and the compressed audio signal CA. In one example, the circuit 134 may have another input configured to receive a compressed sub-picture signal (e.g., ENCODED SUBPICTURE). The compressed subpicture signal may be generated similarly to the compressed video and audio signals CV and CA. In one example, the compressed video signal, the compressed audio signal and the compressed sub-picture signal may be time division multiplexed (TDM) in the signal BITSTREAM. The signal BITSTREAM may be transmitted or stored via the medium 108 for subsequent presentation.

Figure 2:
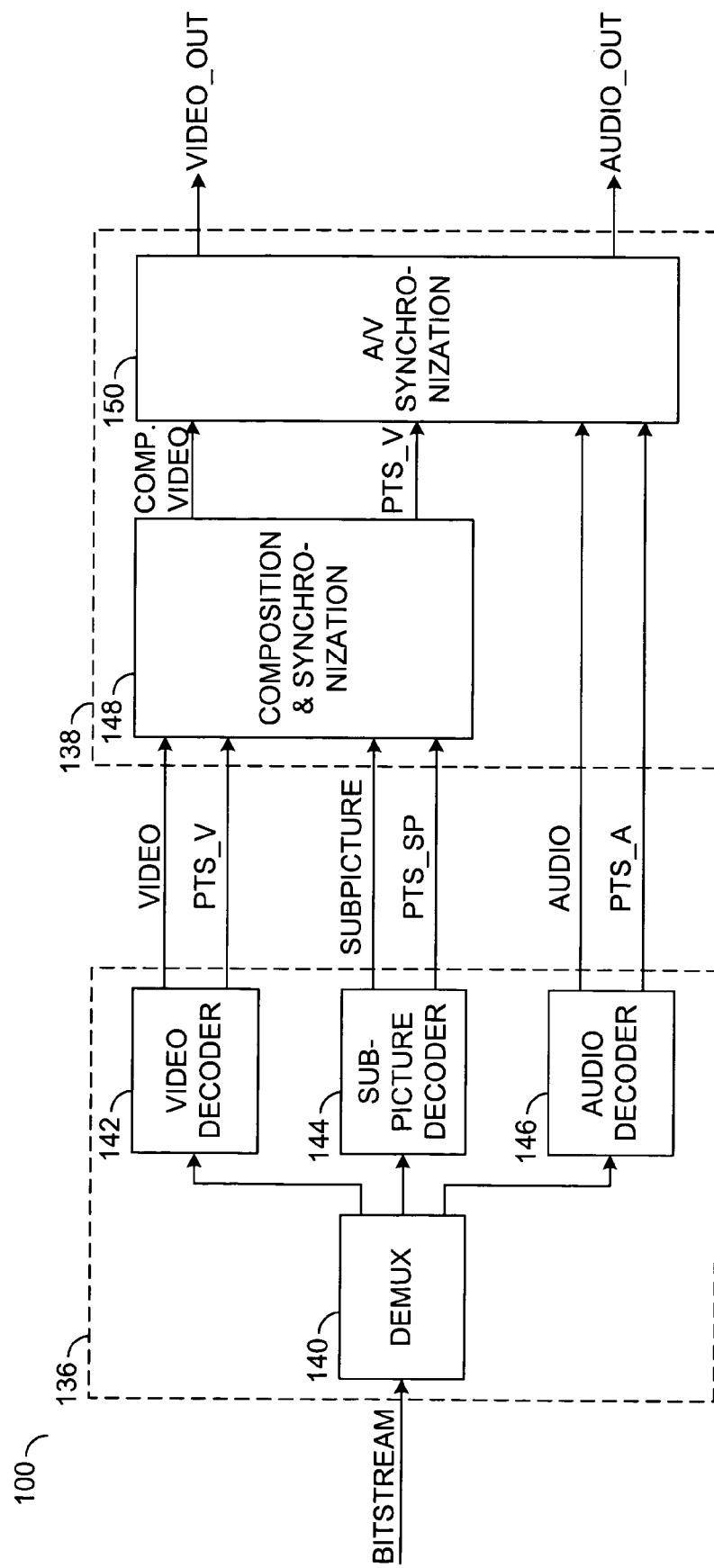
FIG. 2 is a more detailed block diagram illustrating a decoder block of FIG. 1.

Referring to FIG. 2, a more detailed block diagram of the circuit 100 is shown. In one example, the circuit 100 may comprise a circuit (or block) 136 and a circuit (or block) 138. The circuit 136 may be configured to receive the signal BITSTREAM. The circuit 136 may be further configured to present audio and video signals and associated time stamps recovered from the signal BITSTREAM. In one example, the circuit 136 may be configured to present a first signal (e.g., VIDEO), a second signal (e.g., PTS_V), a third signal (e.g., SUBPICTURE), a fourth signal (e.g., PTS_SP), a fifth signal (e.g., AUDIO) and a sixth signal (e.g., PTS_A). The signals VIDEO, SUBPICTURE and AUDIO generally comprise digital signals. The signals PTS_V, PTS_SP AND PTS_A generally comprise presentation time-stamps associated with the signals VIDEO, SUBPICTURE and AUDIO, respectively. The circuit 136 may be implemented using conventional approaches.

The block 138 may be implemented in one example, as an audio-video (A/V) synchronization block. The block 138 may be further configured to composite sub-picture and video (e.g., main picture) information into a single (e.g., composite or blended) video output signal. The block 138 may be configured to synchronize the video and audio signals in response to the video and audio presentation time-stamps (e.g., PTS_V, and PTS_A, respectively) from the block 136. However, in an alternative embodiment, the block 138 may be further configured to recover the presentation time stamps PTS_V and PTS_A from the decoded audio and video signals. The block 138 is generally configured to use the video signal as master and adjust the audio signal until synchronization is obtained. However, the block 138 may be configured to use other signals (e.g., a digital audio signal) as master instead of the video signal. In one example, the block 138 may be configured to repeat and/or drop audio frames and/or audio samples during the synchronization process.

The block 136 may comprise a block 140, a block 142, a block 144, a block 146. The block 140 may be implemented, in one example, as a demultiplexer block. The block 142 may be implemented, in one example, as a video decoder block. The block 144 may be implemented, in one example, as a subpicture decoder block. The block 146 may be implemented, in one example, as an audio decoder block.

The signal BITSTREAM may be presented to an input of the block 140. The block 140 may have a first output that may present a video bitstream to an input of the block 142, a second output that may present a subpicture bitstream to an input of block 144 and a third output that may present an audio bitstream to an input of the block 146. The block 142 may be configured to decode the video bitstream into the signal VIDEO and a presentation time-stamp PTS_V. The block 144 may be configured to generate the signal SUBPICTURE and the presentation time-stamp PTS_SP in response to the compressed subpicture bitstream. The block 146 may have a first output that may present the decoded audio stream AUDIO and a second output that may present the presentation time-stamp PTS_A for the audio frames of the decoded audio stream.

The circuit 138 may comprise a circuit 148 and a circuit 150. In one example, the circuit 148 may be implemented as a composition and synchronization circuit (or block). The circuit 150 may be implemented, in one example, as an audio-video (A/V) synchronization block. The signals VIDEO, PTS_V, SUBPICTURE and PTS_SP may be presented to the block 148. The block 148 may be configured to generate a blended or composite video signal (e.g., COMP. VIDEO) in response to the signals VIDEO, PTS_V, SUBPICTURE and PTS_SP. The circuit 148 generally synchronizes the signals VIDEO and SUBPICTURE using the signals PTS_V and PTS_SP. The signal COMP. VIDEO is generally synchronized to the signal VIDEO as master. The circuit 148 may be configured to present the signal COMP. VIDEO and the presentation time stamp PTS_V to the circuit 150.

The circuit 150 may be further configured to receive the signal AUDIO and the signal PTS_A. The circuit 150 may be configured to generate the signals VIDEO_OUT and AUDIO_OUT in response to the signals COMP. VIDEO, PTS_V, AUDIO, and PTS_A. The circuit 150 generally synchronizes the signals COMP. VIDEO and AUDIO using COMP. VIDEO as master. The circuits 148 and 150 generally implement a handshake scheme between the signals being synchronized. The circuits 148 and 150 may implement hysteresis with a number of thresholds in the synchronization process. The block 148 may be omitted when a single video signal is implemented.

Figure 3:
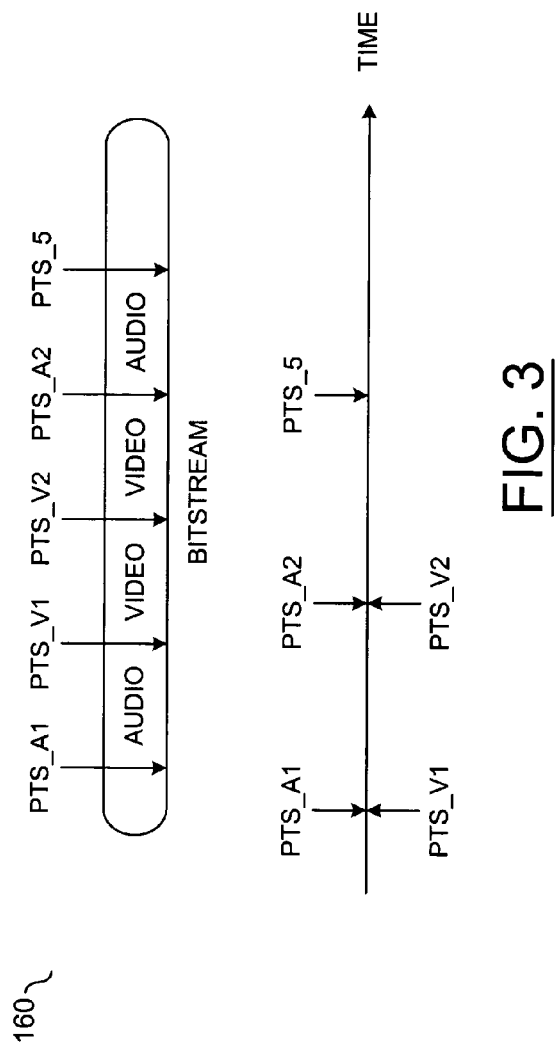
FIG. 3 is a timing diagram illustrating an audio-video bitstream.

Referring to FIG. 3, a timing diagram 160 is shown illustrating an example portion of the signal BITSTREAM. The signal BITSTREAM may comprise audio information (e.g., a compressed or uncompressed version of the original analog audio), video information (e.g., a compressed, or uncompressed for high-end professional applications, version of the original analog video), subpicture information (e.g., a data stream that may include subtitles and/or similar information), timing information, copyright information, navigation information, program information, etc. The timing information generally comprises a time-stamp in each audio frame and each video frame that represents the time at which the encoder generated the video and audio data. Audio and video frames that are substantially simultaneously presented by, for example, a camera are generally tagged with time-stamps (e.g., PTS_A and PTS_V, respectively) having the same value. For example, time-stamps PTS_A1 and PTS_V1 have the same value. Similarly, time-stamps PTS_A2 and PTS_V2 have the same value.

However, when the audio and video frames are multiplexed in the signal BITSTREAM, the audio and video information is not presented simultaneously. Rather, each of the audio and video frames are presented serially. The timing information associated with the audio and video data is generally inserted in-band (e.g., on the same channel or path as the data). For example, the signal BITSTREAM may comprise a concatenation of packets, each packet starting with a header that includes (i) a startcode to enable the demultiplexer to synchronize with the bitstream, (ii) the type of the packet payload, (iii) the time-stamp, if any, associated with the payload and (iv) the size of the payload in the particular packet. The decoder is generally configured to ensure that the frames in the signal BITSTREAM that are tagged with the same time-stamp values are presented simultaneously.

Figure 4:
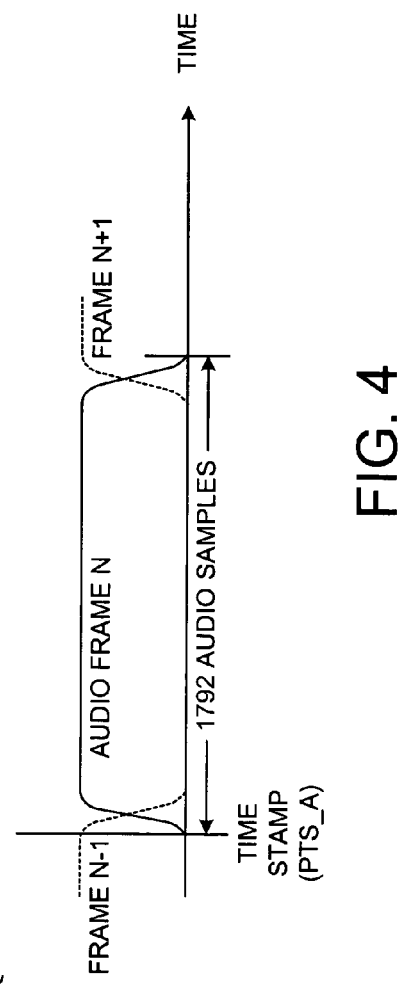
FIG. 4 is a timing diagram illustrating an example audio frame.

Referring to FIG. 4, a timing diagram 170 illustrating an example audio frame is shown. An audio frame generally comprises a number of audio samples. In one example, the audio frame (e.g., an AC-3 syncframe) may contain 1536 audio samples, as well as partially represent 1792 samples.

Figure 5:
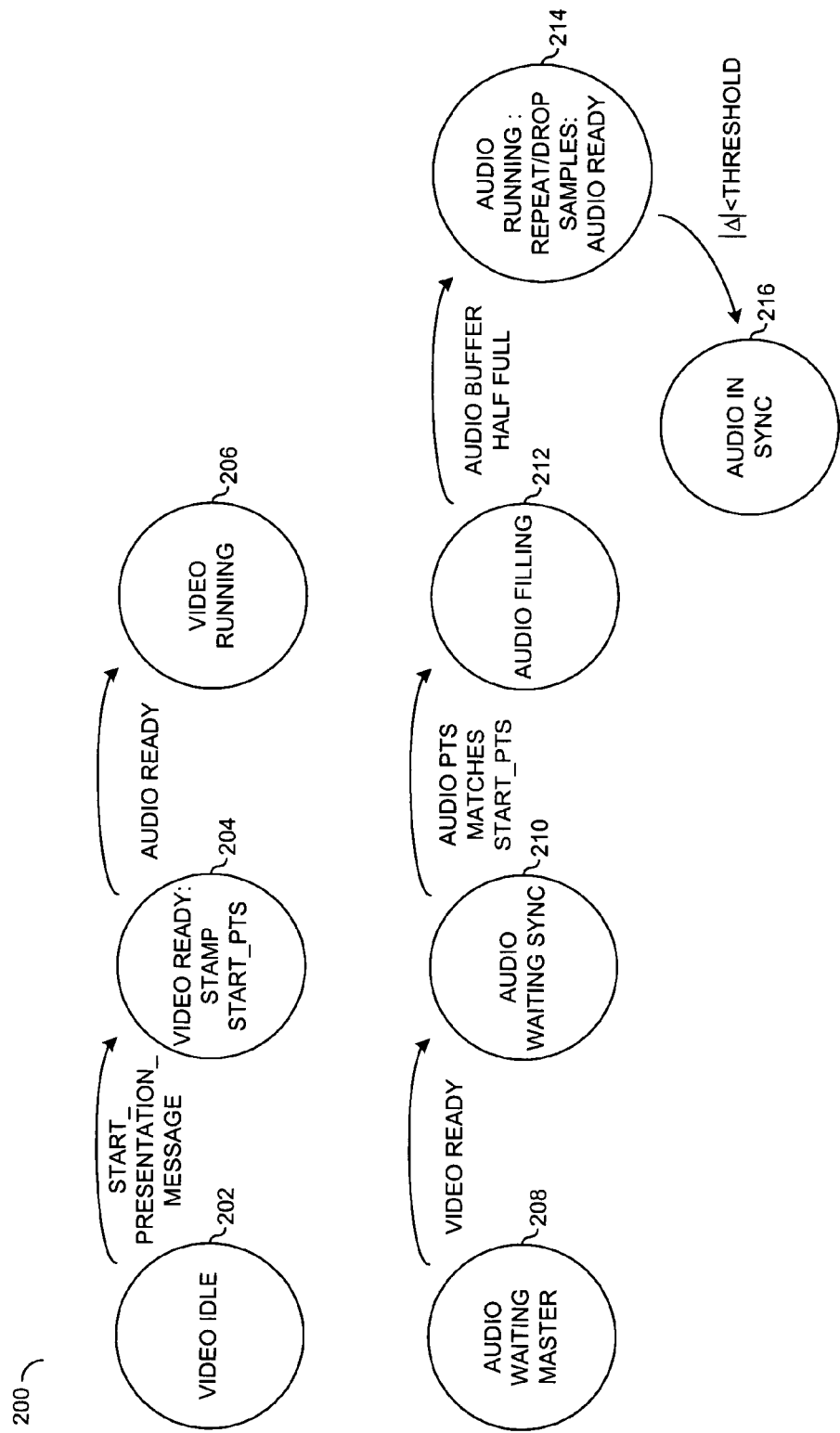
FIG. 5 is a state diagram illustrating an example synchronization operation in accordance with a preferred embodiment of the present invention.

Referring to FIG. 5, a state diagram 200 is shown illustrating various states of an audio-video synchronization process in accordance with a preferred embodiment of the present invention. The synchronization process may comprise a state 202, a state 204, a state 206, a state 208, a state 210, a state 212, a state 214, and a state 216. The states 202-206 generally comprise video processing states. The states 208-216 generally comprise audio processing states. In one example, the interrelationship of the states 202-206 and 208-216 may implement a handshake scheme between audio processing and video processing.

The state 202 may represent an idle video state. The state 204 may represent a ready video state. The state 206 may represent a running video state. The state 208 may represent a state in which the audio is waiting for the video as master. The state 210 may represent a state in which the audio is waiting for coarse synchronization with the video. The state 212 may represent a state in which an audio buffer is being filled. The state 214 may represent a state in which the audio is running. In the state 214, audio samples may be repeated and/or dropped to bring the audio signal into fine synchronization with the video signal. The state 216 generally represents a state in which audio and video are considered synchronized within a predetermined tolerance. Although the synchronization process is shown with video as master, another signal (e.g., a digital audio signal) may be used as master with the process.

The video portion of the synchronization process generally moves from the state 202 to the state 204 in response to a start presentation command (e.g., START_PRESENTATION_MESSAGE). In the state 204, the video is generally indicated as being ready (e.g., a first handshake signal may be generated) and a time-stamp variable (e.g., START_PTS) may be set to a pre-determined value for the time-stamp (e.g., PTS_V) of the video signal. The synchronization process may move from the state 204 to the state 206 in response to the audio becoming ready (e.g., roughly synchronized to the video). For example, a second handshake signal may be implemented indicating when audio is ready.

The audio portion of the synchronization process may move from the state 208 to the state 210 in response to a video frame being ready (e.g., receipt of the first handshake signal). The synchronization process may move from the state 210 to the state 212 in response to a value of the audio presentation time-stamp (e.g., PTS_A) matching the value of the video presentation time-stamp (e.g., START_PTS). The synchronization process may move from the state 212 to the state 214 when an audio buffer has reached a predetermined fill point (e.g., half full, etc.). The second handshake signal may be generated (or asserted) when the synchronization process is in the state 214. However, other conditions may be implemented accordingly to meet the design criteria of a particular implementation. The synchronization process may monitor a difference between the synchronization of the video and the audio signals. When the synchronization difference (e.g., |Δ|, or D) is less than a predetermined threshold (e.g., THRESHOLD), the synchronization process may move from the state 214 to the state 216.

Figure 6:
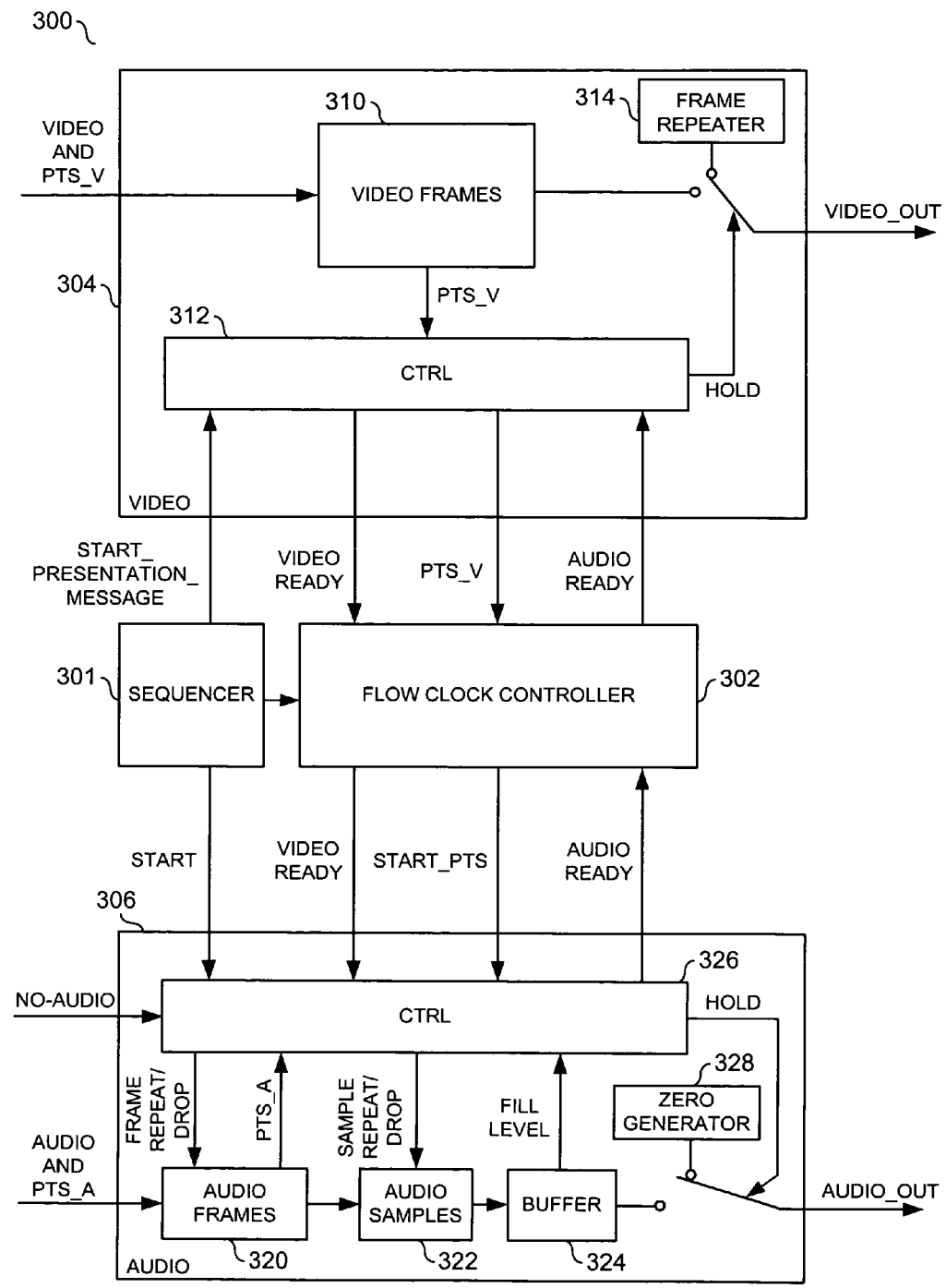
FIG. 6 is a more detailed block diagram illustrating a preferred embodiment of the present invention.

Referring to FIG. 6, a block diagram of a circuit (or block) 300 is shown illustrating an example synchronization block in accordance with the present invention. The block 300 may be implemented as part of the block 148 and/or the block 150, described above in connection with FIG. 2. The block 300 may be implemented in hardware, software (or firmware) or a combination of hardware and software. In one embodiment, the circuit 300 may comprise a circuit (or block) 301, a circuit (or block) 302, a circuit (or block) 304 and a circuit (or block) 306. The block 301 may be implemented, for example, as a sequencer (or state machine or process). The block 302 may be implemented, for example, as a flow clock controller (or process). The block 304 may be implemented, in one example, as a video process (or processor) The block 306 may be implemented, in one example, as an audio process (or processor). In one example, the flow clock controller 302 may represent an interface used by the video process 304 and the audio process 306 to communicate with each other. The flow clock controller 302 generally does not imply a call-back mechanism or a separate thread of control.

Initially, audio and video flows may be stopped. Both audio and video generally (i) hold until the video output has received a first new frame, (ii) the audio output has dropped/repeated one or more frames to approximately match the audio PTS (e.g., PTS_A) with the video PTS (e.g., PTS_V) of the first new video frame (e.g., coarse synchronization) and (iii) the audio output has filled, for example, half of a buffer with audio data. When both audio and video are ready, both are enabled to start transmitting data. In one example, a detailed synchronization sequence may be described by the following psuedo code.

A flow clock control structure S may be defined with elements {START_PTS (PTS64 format), VIDEO READY, AUDIO READY}. At initialization and after dvdplayback stop( ) {START_PTS=INVALID, VIDEO READY=TRUE, AUDIO READY=TRUE}. The set of parameters above generally ensures the previously implemented audio-video synchronization behavior may be used for loopthrough, etc. At dvdplayback start( ), the flow clock controller 302 may be configured to set S={START_PTS=INVALID, VIDEO READY=FALSE, AUDIO READY=FALSE}. At start, the video process 304 and the audio process 306 are generally in following states: the video process 304 (i) does not free data, (ii) outputs a blank screen or the last picture (e.g., frame repeat) and (iii) is configured to respond to commands; the audio process 306 (i) does not free data, (ii) outputs zeros and (iii) is configured to respond to commands.

The flow clock controller (FCC) 302 generally maintains information regarding which process (e.g., audio or video) is master and which process (or processes) is (are) slave. In general, the sequencer 301 generally tells the flow clock controller 302 the respective status of the video and audio processes 304 and 306. In one example, the block 301 may be configured to convert top-level commands (e.g., "stop", "pause", etc.) into instructions or signals that underlying software and/or hardware components may understand. For example, the sequencer 301 may tell the flow clock controller that the audio process 306 is slave and the video process 304 is master. The video process 304 and the audio process 306 are generally configured to check the flow clock controller to determine whether the respective process is master or slave.

The flow clock controller may be implemented as a set of synchronization functions that (i) may be called by the video process 304 and the audio process 306 and (ii) may hold synchronization variables that may be written to and/or read from by the video and audio processes. The flow clock controller generally does not, for example, imply call-back notification of a state change. For example, the video process 304 may call the flow clock controller to set VIDEO READY to TRUE. Subsequently, the audio process may use a relevant flow clock controller function to determine that VIDEO READY is TRUE.

When the video process 304 receives a start command (e.g., START_PRESENTATION_MESSAGE) from the sequencer 301, the video process 304 generally sends the presentation time-stamp value of the data that is ready to be transmitted (e.g., PTS_V). The flow clock controller generally sets the variable START_PTS to the value of the presentation time-stamp value of the data that is ready to be transmitted (e.g., PTS_V). The video process 304 sets VIDEO READY to TRUE, and continues to present the video frame presented at the start of the synchronization procedure.

The sequencer 301 generally sends a start command to the audio process 306. When the START_PTS is valid, the audio process 306 holds or drops frames until the presentation time-stamp of the audio data (e.g., PTS_A) matches the value of the video time stamp (e.g., PTS_V) in the variable START_PTS. The comparison of the audio presentation time-stamp with the variable START_PTS may be performed by the audio process 306 or through a function implemented as part of the flow clock controller 302 (e.g., the flow clock controller may comprise functions and data that may be called in the audio task context). When the audio time-stamp matches the video time-stamp, the audio process 306 may be configured to fill a buffer to a predetermined fullness. Zeros are generally output during the above steps. When the buffer fullness reaches a predetermined threshold (e.g., half-full, etc.), the audio process 306 generally sets AUDIO READY to TRUE and audio data starts to be transmitted. If the audio process 306 receives a signal or message (e.g., NO_AUDIO) from the demultiplexing circuit (e.g., the circuit 136) or times out, the audio process 306 generally sets AUDIO READY to TRUE.

When the video process 304 detects that AUDIO READY is TRUE, the video process 304 generally starts to transmit video data. The audio process 306 may be configured to repeat/drop samples while transmitting unmuted in order to achieve a better synchronization.

In one example, the block 304 may comprise a block (or process) 310, a block (or process) 312 and a block (or process) 314. The block 310 may be implemented as a video frame block. The block 312 may be implemented as a control block. The block 314 may be implemented as a frame repeater block. The signal VIDEO (or COMP. VIDEO) and the presentation time-stamp PTS_V may be presented to an input of the block 310. The block 310 may be configured to present the presentation time-stamp PTS_V to the block 312. The block 312 may be configured to receive the signal START_PRESENTATION_MESSAGE from the sequencer 301. The block 312 may present a signal to or set a variable of (e.g., VIDEO READY) the flow clock controller 302 and present the presentation time-stamp PTS_V to the flow clock controller 302. The block 312 may be configured to determine (e.g., via the flow clock controller 302) when audio is ready (e.g., the signal AUDIO READY). The block 312 may be configured to generate a signal (e.g., HOLD) that may be used to select between an output of the block 310 and an output of the block 314 for presentation as the signal VIDEO_OUT.

The block 306 may comprise in one example, a block (or process) 320, a block (or process) 322, a block (or process) 324, a block (or process) 326 and a block (or process) 328. The block 320 may be configured to manipulate audio frames of the signal AUDIO. The block 322 may be configured to manipulate audio samples of the signal AUDIO. The block 324 may be implemented as an audio buffer. The block 326 may be implemented as a control block. The block 328 may be implemented as a zero generator.

The block 320 generally receives the signals AUDIO and PTS_A. The block 320 may be configured, in one example, to present the signal PTS_A to the control block 326. The block 320 may be configured to repeat and/or drop one or more audio frames in response to commands (or information) received from the block 326 (e.g., via a signal FRAME REPEAT/DROP). The block 320 may present the audio frames or audio samples to the block 322.

The block 322 may be configured to repeat or drop one or more audio samples of the audio frames in response to commands (or information) received from the control block 326 (e.g., via a signal SAMPLE REPEAT/DROP). An output of the block 322 is generally presented to an input of the buffer 324. The buffer 324 may be configured to present a signal (e.g., FILL LEVEL) to the control block 326. The signal FILL LEVEL generally is configured to indicate a level of fullness of the buffer 324.

The control block 326 may be configured (i) to receive a start instruction (e.g., START) from the sequencer 301, (ii) to receive the signals VIDEO READY and START_PTS from the flow clock controller 302 and (iii) to present a control signal to or set a variable in (e.g., AUDIO READY) the flow clock controller 302. The control block 326 may be configured to generate a control signal (e.g., HOLD) that may be used to select between an output of the buffer 324 and an output of the zero generator block 328 for presentation as the signal AUDIO_OUT.

In general, the functions performed by the blocks 301, 302, 304 and 306 may be implemented using conventional techniques according to the teachings of the present specification, as will be apparent to those skilled in the relevant art(s).

A variable (e.g., D) may be implemented to represent the synchronization offset between the signals VIDEO_OUT and AUDIO_OUT. Synchronization may be adjusted to reduce a value of the variable D below a predetermined threshold. In one example, the threshold may be set to 500 samples (e.g., 10.4 msec at 48 kHz). However, other thresholds may be implemented accordingly to meet design criteria of a particular implementation.

Audio-video synchronization may be lost while streaming if, for example, there is an underflow. Audio-video synchronization may also be lost during Pause/Step/Resume transitions. The present invention may provide a process for recovering audio-video synchronization while streaming that may be implemented, in one example, by following two steps. In a first step, the current error timing error corrected for latency until current data is "on air" may be calculated according to the following equation:

$$D = \text{flow clock} - \text{audio } PTS - \text{isr}PtsCorrection + \text{two}ISR + \text{latency},$$

where flow clock represents time set by the flow clock master, audio PTS represents the PTS read from the audio header, isrPtsCorrection represents a current value of a hardware PTS (e.g., a value stamped at last Audio ISR), twoISR (converted into PTS units) represents the length of two Audio ISR DMA transfers in time (e.g., one ISR length is because of the hardware queue and the other ISR length is because the ISR reader refers to the next ISR while the isrPtsCorrection is referred to the previous ISR) and latency (converted into PTS units) is generally equal to final buffer write (AO task)—Final buffer read pointer (ISR). D is generally converted into units of time where one unit is the length of 1 audio sample (e.g., at 48 kHz D'=D*48,000/90,000). In a second step, D' may be smoothed with a finite impulse response (FIR) filter as summarized by the following equation:

$$\Delta' \text{ frame smooth} = \text{filter (latest } D').$$

The filter generally contains the PTS from N packets up to and including the last packet. Each PTS is generally normalized by multiplying by 1/N and the filter returns the sum of the normalized PTSs. In one example, N may be set to 4.

Figure 7:
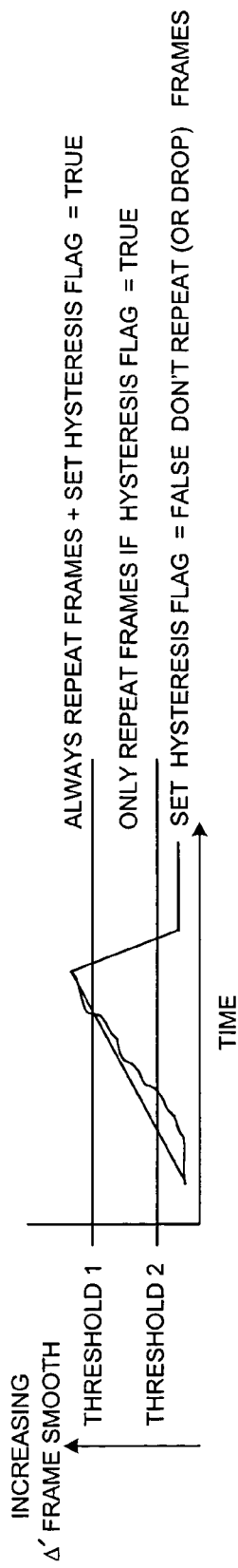
FIG. 7 is a timing diagram illustrating example thresholds for providing hysteresis in a synchronization decision.

Referring to FIG. 7, a timing diagram illustrating example hysteresis thresholds is shown. In one example, a pair of thresholds (e.g., THRESHOLD 1 and THRESHOLD 2) may be implemented to determine when audio frames are dropped or repeated. By implementing a pair of thresholds, the present system may provide hysteresis. As used herein, hysteresis generally refers to a process or property where an input threshold changes as a function of the input (or output) level. More specifically, in a system with hysteresis, an output signal generally changes (i) from a first state to a second state when an input signal crosses a first threshold and (ii) changes from the second state to the first state when the input signal crosses a second threshold. The amount of hysteresis is generally determined by the difference between the first threshold and the second threshold. In general, the hysteresis filter may be configured to determine whether to play, drop or repeat frames.

Hysteresis is generally implemented to (i) reduce the probability of a small fluctuation in Δ' frame smooth during unmuted play causing frames to be repeated or dropped and (ii) ensure that if a fluctuation occurs and synchronization is lost, the synchronization may be brought back into a narrow synchronization window. In general, hysteresis determined by the thresholds THRESHOLD 1 and THRESHOLD 2 may be used to decide when to repeat frames when D' frame smooth is greater than 0. For example, while Δ' frame smooth is less than THRESHOLD 2 a hysteresis flag may be set (e.g., de-asserted) and no frames are repeated (or dropped). When Δ' frame smooth exceeds THRESHOLD 1, the hysteresis flag may be set TRUE (e.g., asserted) and frames are always repeated as long as Δ' frame smooth exceeds THRESHOLD 1. When Δ' frame smooth is less than THRESHOLD 1 and greater than THRESHOLD 2, frames are repeated when the hysteresis flag is set TRUE. Otherwise, frames are not repeated.

Since the hysteresis flag is set when Δ' frame smooth is greater than or equal to THRESHOLD 1 and reset when Δ' frame smooth is less than or equal to THRESHOLD 2, hysteresis is provided that may reduce sensitivity to small variations in Δ' frame smooth. The amount of hysteresis (e.g., the size of a fluctuation in Δ' frame smooth that results in change in frame repeat/drop behavior) is generally controlled by selection of THRESHOLD 1 and THRESHOLD 2. Another pair of thresholds (not shown) may be implemented symmetrically about the Δ' frame smooth=0 axis to control the decision whether to drop frames.

Figure 8:
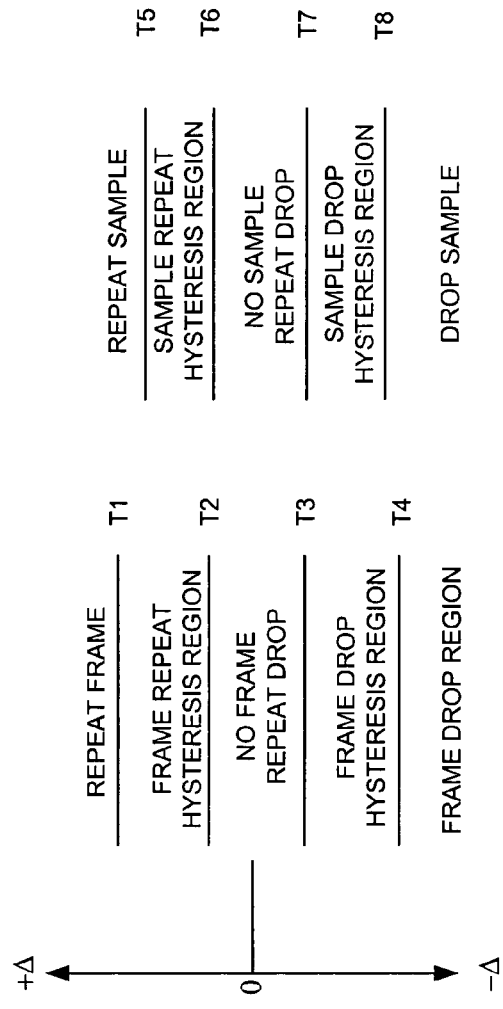
FIG. 8 is a timing diagram illustrating a plurality of hysteresis thresholds in accordance with a preferred embodiment of the present invention.

Referring to FIG. 8, a timing diagram illustrating example thresholds for controlling frame and sample repeat/drop decisions in accordance with the present invention are shown. In one example, a number of thresholds (e.g., T1-T8) may be implemented to determine whether audio frames are dropped and/or repeated and/or audio samples are dropped and/or repeated. The determination of whether to repeat or drop samples may be implemented in a similar way to the frame repeat or drop decision. In one example, smoothing of D may be performed with a filter length of 8 rather than the filter length of 4 used for frame repeat/drop determinations. In one example, the thresholds for repeating and dropping samples and frames may set for positive and negative values of D (or A) to the following values:

T1=2048 samples (43 msec at 48 KHz)
T2=T6=1024 samples (21 msec at 48 KHz)
T3=T7=−1024 samples (−21 msec at 48 KHz)
T4=−2048 samples (−43 msec at 48 KHz)
T5=T6+128 samples (T6+2.3 msec at 48 kHz)
T8=T7−128 samples (T7−2.3 msec at 48 kHz)

However, other values may be implemented to meet the design criteria of a particular implementation.

Figure 9:
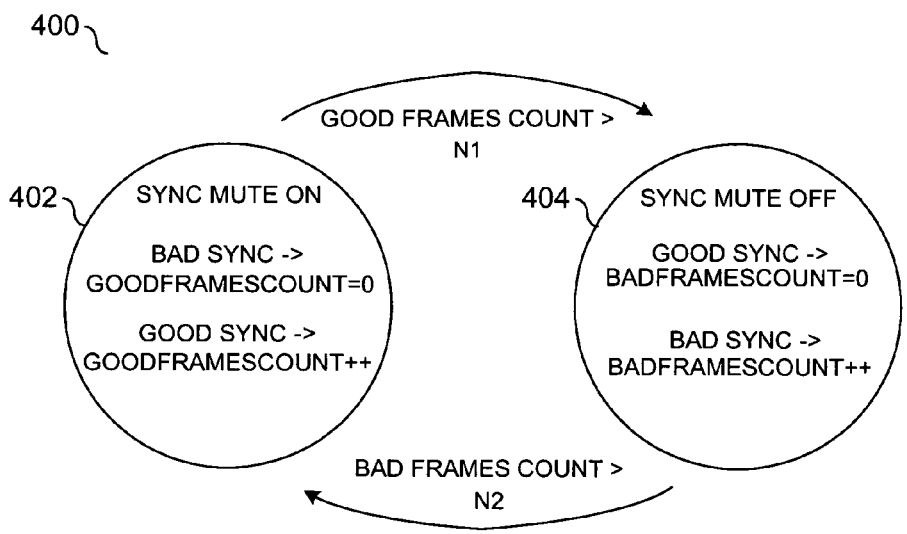
FIG. 9 is a state diagram illustrating a mute decision in accordance with the present invention.

Referring to FIG. 9, a state diagram 400 is shown illustrating a control decision for controlling a mute parameter during synchronization. In one example, the mute/unmute decision process may be coupled to the A/V synchronization. The mute/unmute decision process may have a state 402 in which mute is on during synchronization and a state 404 in which mute is off during synchronization. The process may be configured to move from the state 402 to the state 404 in response to a number of good frames counted being greater than a first threshold (e.g., N1). The process may be further configured to move from the state 404 to the state 402 in response to a number of bad frames counted being greater than a second threshold (e.g., N2). In general, the state 402 represents a state in which a determination of bad synchronization results in the good frame count being set to zero and a determination of a good synchronization increments a good frame count value. In the state 404, the process generally zeros a bad frame count variable in response to detection of good synchronization and increments the bad frame count variable in response to detection of bad synchronization. The thresholds N1 and N2 generally provide hysteresis to the mute/unmute decision process.

When frames are repeatedly dropped or repeated because of a loss of A/V synchronization, the audio is generally muted. When A/V synchronization is re-acquired, the audio is generally unmuted. If the mute decision is made on whether a single frame is played, dropped or repeated, however, repeated muting and unmuting may occur due to transient A/V synchronization behavior. The present invention generally mitigates repeated muting and unmuting by applying hysteresis to the decision when to mute and unmute. A process for muting and unmuting in accordance with the present invention may be summarized as follows:

When slave audio can exist in one of two states:

| | |
|---|---|
| SYNC MUTE ON | (mute audio because of bad synchronization); |
| SYNC MUTE OFF | (synchronization good so no sync mute). |

Thresholds are generally used to determine whether the synchronization is good or not. For example, IF mod(D'frame smooth)>Threshold THEN BAD SYNC ELSE GOOD SYNC Thresholds on the good and bad frame counts may be used to determine the transitions between the two states 402 and 404.

The present invention generally uses video as master and audio as slave. For analog audio and IEC 958 signals the mechanism for A/V synchronization is generally for audio to drop or repeat audio frames and/or drop or repeat audio samples. The present invention may provide a mode to maintain A/V synchronization by changing the rate of data consumption even though the audio is unmuted. For example, the present invention may be used with a digital video (DV) input. Another example is after a playback sequencer start when audio is unmuted after an initial synchronization has been achieved even though synchronization may not have achieved the final target accuracy. The present invention allows fine tuning of the A/V synchronization.

In general, repeating or dropping audio frames when unmuted may be unacceptable because clearly discernable audible artifacts may be generated. The present invention may repeat or drop M in N audio samples, where M and N are integers. In a preferred embodiment, M may be fixed at 1 and N may be fixed at 128. A "sampling slip" audio filter may be used with the present invention to smooth over the repeated or dropped sample(s). For example, the sampling slip filter generally works using "timeshift, ramp and add" as follows:

Define X(m: m=0: m=L) as a vector with first index m=0 and last index m=L.

To remove (or drop) a sample:
1. Let A(m: m=0: m=N−2)=I($t_i$: i=0: i=N−2) be one set of input samples;
2. Apply linear ramp down on A with scale factor 1 to 0;
3. Let B(m: m=0: m=N−2)=I($t_i$, i=1: I=N−1) be a time-shifted set of samples;
4. Apply linear ramp up on B with scale factor 0 to 1;
5. Define filter output C(n:n=0:n=N−2)=A(n)+B(n).

To repeat a sample:
1. Let A(m: m=0: m=N−1)=I($t_i$: i=0: i=N−1) be one set of input samples;
2. Define A(N)=0;
3. Apply linear ramp down on A with scale factor 1 to 0;
4. Let B(m: m=1: m=N)=I($t_i$, i=0: I=N−1) be the same time-shifted set of samples;
5. Define B(0)=0;
6. Apply linear ramp up on B with scale factor 0 to 1;
7. Define filter output C(n:n=0:n=N)=A(n)+B(n).

Sample repeat/drop generally produces a slight pitch change. However, the change in pitch is generally only noticeable with a pure sine-wave output. Sample repeat/drop may also be relatively slow in adjusting synchronization. For example, to achieve a 20 msec synchronization adjustment, sample repeat/drop may take 20 msec×128=2.56 s.

For certain trick plays, maintaining approximate A/V synchronization may be necessary in order to minimize data loss and the length of time for achieving A/V synchronization when normal play conditions are resumed. Examples may include certain play speed changes or DVD Video pause/resume. In order to minimize the chance of glitches happening during the transition, the audio is generally internally muted during the trick play (for example slow play). When the playback sequencer sets the play back to normal (for example normal speed) an audio sequencer api may be called to put the audio in the SYNC MUTE ON state with goodFramesCount=0.

Figure 10:
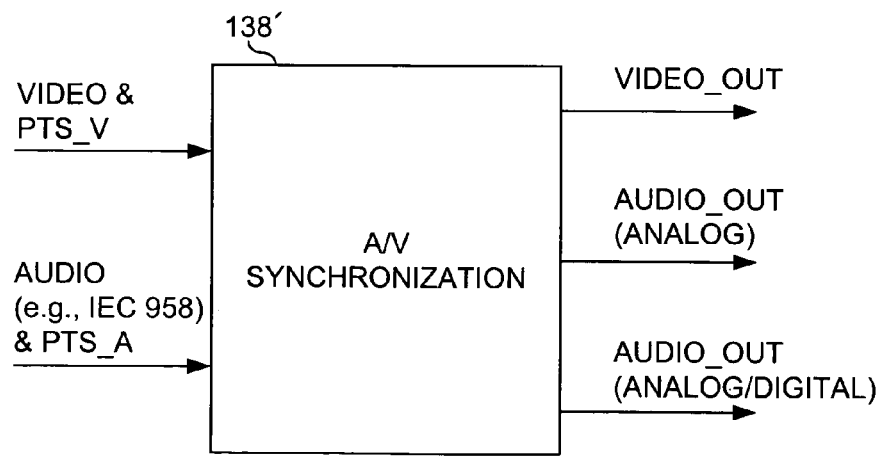
FIG. 10 is a block diagram illustrating an alternative embodiment of the present invention.

Referring to FIG. 10, a block diagram of a circuit 138' is shown illustrating another embodiment of the present invention. The circuit 138' may be configured to present a plurality of audio output signals. In one example, the circuit 138' may be configured to present the signal AUDIO_OUT comprising a number of analog audio output signals. In another example, the circuit 138' may be configured to present the signal AUDIO_OUT as an analog output signal and as a digital signal. For example, the digital signal generally contains the same information as the analog signal, but in a digital format. In one example, the digital audio output signal may be implemented as an IEC61937 compliant signal.

In general, when the circuit 138' is configured to output a plurality of analog audio signals, each of the audio signals are slaved to the video signal and synchronization may be performed as described above. However, the video signal and the plurality of audio signals wait to be transmitted until all of the audio signals are ready.

When the circuit 138' is configured to output an analog audio signal and a digital audio signal (e.g., an IEC61937 signal), the synchronization process may be modified. The analog audio signal and the digital audio signal are generally synchronized coarsely to the video signal as master according to the process described above in connection with FIG. 5. However, for the digital audio signal, particularly an IEC61937 type signal, fine synchronization to the video signal may not be possible. Instead, once coarse synchronization is obtained between the video and the audio signals, the analog audio signal may be fine synchronized with the digital audio signal as master. In general, the precision of the synchronization between the analog and digital audio signals is more critical than the precision of the synchronization of the audio relative to the video.

Once the audio signals (e.g., both analog and digital) and the video signal have been coarsely synchronized, the audio may be unmuted. The fine synchronization of the analog audio with the digital audio as master may be performed with audio unmuted.

Figure 11:
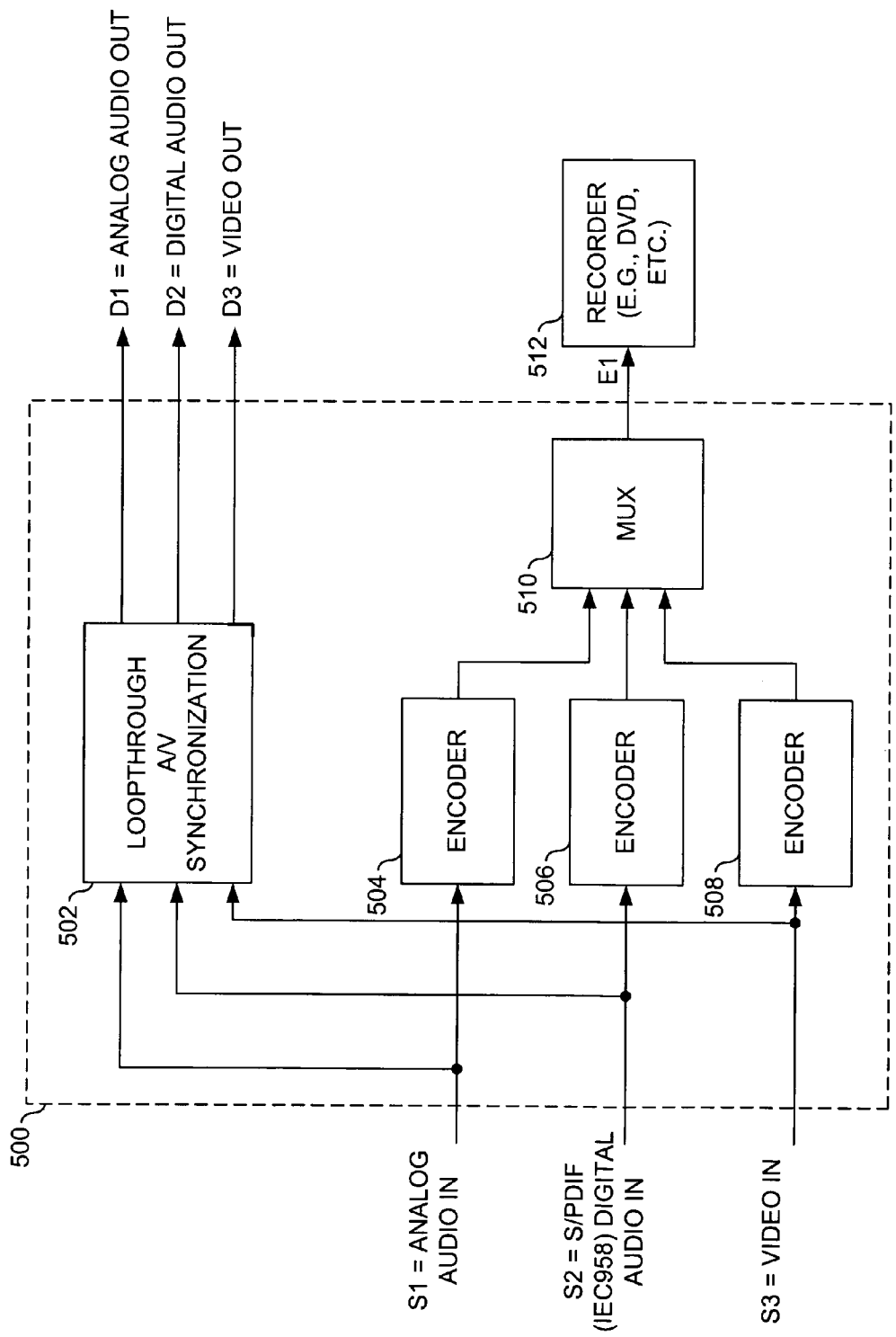
FIG. 11 is a block diagram illustrating another alternative embodiment of the present invention.

Referring to FIG. 11, a block diagram illustrating an alternative embodiment in accordance with the present invention is shown. A/V synchronization may also be implemented on a record/loopthrough side of a Sony/Philips digital interface format (S/PDIF). In one example, a circuit 500 may be implemented. The circuit 500 may have a first input S1 that may receive an analog audio input, a second input S2, that may receive a S/PDIF (IEC958) digital audio input and a third input S3 that may receive a signal VIDEO_IN. The circuit 500 may have a first output D1 that may present a loopthrough analog AUDIO_OUT signal, an output D2 that may present a loopthrough digital audio output signal, an output D3 that may present a video output signal and an output E1 that may present a bitstream signal. The circuit 500 may comprise a loopthrough A/V synchronization block 502, a number of encoders 504-508, and a multiplexer circuit 510. The encoders 504-508 and the multiplexer 510 may operate in parallel with the loopthrough circuit 502. The bitstream signal presented at the output E1 may be presented to, in one example, a DVD recorder 512.

In one example, the loopthrough digital audio output may be used as the master and the loopthrough analog audio output and video output may be slaved to the digital audio output. In general, the synchronization process may be implemented similarly to the process described above except that the loopthrough digital audio output takes the role that video had in the above discussion. For example, the handshaking process involves the loopthrough digital audio output setting the initial presentation time stamp and waiting for both the loopthrough analog audio output and the video output to be ready before all three begin transmitting.

As used herein, the terms "simultaneous" and "simultaneously" are meant to describe events that share some common time period but the term is not meant to be limited to events that begin at the same point in time, end at the same point in time, or have the same duration.

The function(s) performed by the present invention may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for synchronizing an audio stream and a video stream, comprising the steps of:
    (A) holding transmission of said video stream and determining a first presentation time stamp from said video stream;
    (B) generating a first handshake signal having an asserted state indicating that said video stream is ready to be transmitted;
    (C) repeating and dropping one or more audio frames of said audio stream in response to receiving the asserted state of said first handshake signal, wherein repeating and dropping the one or more audio frames of said audio stream continues until a second presentation time stamp, from said audio stream, matches said first presentation time stamp, and wherein decisions on whether to repeat or drop audio frames are made based upon a synchronization offset between said video stream and said audio stream and a plurality of first predetermined threshold values;
    (D) generating a second handshake signal having an asserted state in response to said second presentation time stamp approximately matching said first presentation time stamp, wherein said asserted state of said second handshake signal indicates that said audio stream is ready to be transmitted with said video stream; and
    (E) transmitting said video stream and said audio stream in response to the asserted state of said second handshake signal.

2. The method according to claim 1, wherein the step (B) further comprises:
    dropping or repeating one or more audio samples.

3. The method according to claim 2, wherein the step of (B) further comprises:
    dropping or repeating M in N audio samples, where M and N are integers.

4. The method according to claim 3, wherein M is fixed at 1 and N is fixed at 128.

5. The method according to claim 1, wherein the step (B) comprises one or more of (i) repeating one or more audio frames of said audio stream, (ii) repeating one or more audio samples of said audio stream, (iii) dropping one or more audio frames of said audio stream and (iv) dropping one or more audio samples of said audio stream.

6. The method according to claim 1, further comprising the step of:
    repeating and dropping audio samples according to a plurality of second predetermined threshold values while transmitting said audio stream unmuted.

7. The method according to claim 6, wherein:
    said plurality of second predetermined threshold values are configured to provide hysteresis to a process for determining when to repeat said audio samples and when to drop said audio samples.

8. The method according to claim 6, wherein:
    said plurality of first predetermined threshold values define (i) a first region where no frames are repeated or dropped and a first hysteresis flag is set to a first state, (ii) a second region where frames are always repeated and the first hysteresis flag is set to a second state, (iii) a third region where frames are repeated only when the first hysteresis flag is set to the second state, (iv) a fourth region where frames are always dropped and the first hysteresis flag is set to the second state, and (v) a fifth region where frames are dropped only when the first hysteresis flag is set to the second state; and
    said plurality of second predetermined threshold values define (i) a sixth region where no samples are repeated or dropped and a second hysteresis flag is set to a first state, (ii) a seventh region where samples are always repeated and the second hysteresis flag is set to a second state, (iii) an eighth region where samples are repeated only when the second hysteresis flag is set to the second state, (iv) a ninth region where samples are always dropped and the second hysteresis flag is set to the second state, and (v) a tenth region where frames are dropped only when the second hysteresis flag is set to the second state.

9. The method according to claim 1, wherein said plurality of first threshold values are further configured to provide hysteresis to a process for determining when to repeat said audio frames and when to drop said audio frames.

10. The method according to claim 1, further comprising the step of:
    muting said audio stream in response to a first count of bad synchronized frames exceeding a first predetermined value; and
    unmuting said audio stream in response to a second count of good synchronized frames exceeding a second predetermined value.

11. An apparatus comprising:
    a first circuit configured to (i) hold transmission of a video stream, (ii) determine a first presentation time stamp from said video stream and (iii) generate a first handshake signal having an asserted state indicating that said video stream is ready to be transmitted;
    a second circuit configured (i) to repeat and drop one or more audio frames of an audio stream in response to receiving the asserted state of said first handshake signal, wherein repeating and dropping the one or more audio frames of said audio stream continues until a second presentation time stamp, from said audio stream, matches said first presentation time stamp and (ii) to generate a second handshake signal having an asserted state in response to said second presentation time stamp approximately matching said first presentation time stamp, wherein decisions on whether to repeat or drop audio frames are made based upon a synchronization offset between said video stream and said audio stream and a plurality of first threshold values, said asserted state of said second handshake signal indicates that said audio stream is ready to be transmitted with said video stream, and said first and second circuits are further configured to transmit said video stream and said audio stream in response to the asserted state of said second handshake signal.

12. The apparatus according to claim 11, wherein said second circuit is further configured to repeat or drop one or more audio samples to achieve a better synchronization between said video stream and said audio stream.

13. The apparatus according to claim 12, wherein said second circuit is further configured to repeat or drop M in N audio samples, where M and N are integers.

14. The apparatus according to claim 13, wherein M is fixed at 1 and N is fixed at 128.

15. The apparatus according to claim 11, wherein said second circuit is configured to perform one or more of (i) repeating one or more audio frames of said audio stream, (ii) repeating one or more audio samples of said audio stream, (iii) dropping one or more audio frames of said audio stream and (iv) dropping one or more audio samples of said audio stream.

16. The apparatus according to claim 11, wherein said second circuit is further configured to:
repeat and drop audio samples according to a plurality of second predetermined threshold values while transmitting said audio stream unmuted to achieve a better synchronization between said video stream and said audio stream.

17. The apparatus according to claim 16, wherein:
said plurality of second predetermined threshold values are configured to provide hysteresis to a process for determining when to repeat said audio samples and when to drop said audio samples.

18. The apparatus according to claim 11, wherein said plurality of first predetermined threshold values is further configured to provide hysteresis to a process for determining when to repeat said audio frames and when to drop said audio frames.

19. The apparatus according to claim 11, wherein:
said second circuit is further configured to (i) mute said audio stream in response to a first count of bad synchronized frames exceeding a first predetermined value and (ii) unmute said audio stream in response to a second count of good synchronized frames exceeding a second predetermined value.

20. The apparatus according to claim 11, wherein said second circuit is further configured to delay generating said second handshake signal having said asserted state until an audio buffer reaches a predetermined fill point following said second presentation time stamp approximately matching said first presentation time stamp.

21. An apparatus for synchronizing a first stream and a second stream comprising:
means for holding transmission of said first stream, determining a first presentation time stamp from said first stream and generating a first handshake signal having an asserted state indicating that said first stream is ready to be transmitted;
means for repeating and dropping one or more frames of said second stream in response to receiving the asserted state of said first handshake signal, wherein repeating and dropping the one or more frames of the second stream continues until a second presentation time stamp, from said second stream, matches said first presentation time stamp, and wherein decisions on whether to repeat or drop audio frames are made based upon a synchronization offset between said video stream and said audio stream and a plurality of first predetermined threshold values;
means for generating a second handshake signal having an asserted state in response to said second presentation time stamp approximately matching said first presentation time stamp, wherein said asserted state of said second handshake signal indicates that said second stream is ready to be transmitted with said first stream; and
means for transmitting said first stream and said second stream in response to the asserted state of said second handshake signal.

22. The apparatus according to claim 21, wherein said first stream comprises one or more video streams and said second stream comprises one or more audio streams.

23. the apparatus according to claim 21, wherein said first stream comprises a digital audio stream and said second stream comprises one or more video streams and one or more analog audio streams.

24. The apparatus according to claim 21, further comprising:
means for muting said audio stream in response to a first count of bad synchronized frames exceeding a first predetermined value; and
means for unmuting said audio stream in response to a second count of good synchronized frames exceeding a second predetermined value.

* * * * *